(12) United States Patent
Cheng et al.

(10) Patent No.: US 8,406,076 B2
(45) Date of Patent: Mar. 26, 2013

(54) FRDY PULL-UP RESISTOR ACTIVATION

(75) Inventors: Steven S. Cheng, Sunnyvale, CA (US);
Peter Hwang, Newark, CA (US); Annie C. Chang, San Jose, CA (US)

(73) Assignee: SanDisk Technologies Inc., Plano, TX (US)

( * ) Notice: Subject to any disclaimer, the term of this patent is extended or adjusted under 35 U.S.C. 154(b) by 460 days.

(21) Appl. No.: 12/824,703

(22) Filed: Jun. 28, 2010

(65) Prior Publication Data

US 2011/0320686 A1    Dec. 29, 2011

(51) Int. Cl.
*G11C 11/413* (2006.01)
(52) U.S. Cl. ...................................................... 365/227
(58) Field of Classification Search .................. 365/226, 365/227, 185.11, 185.22; 713/320, 323
See application file for complete search history.

(56) References Cited

U.S. PATENT DOCUMENTS

| | | | | | |
|---|---|---|---|---|---|
| 4,972,374 | A | * | 11/1990 | Wang et al. | 365/205 |
| 6,018,479 | A | * | 1/2000 | Jeong | 365/189.11 |
| 6,192,429 | B1 | * | 2/2001 | Jeong et al. | 710/58 |
| 7,602,645 | B2 | * | 10/2009 | Popoff et al. | 365/185.14 |
| 2006/0195650 | A1 | | 8/2006 | Su et al. | |
| 2007/0058480 | A1 | | 3/2007 | Hwang | |
| 2007/0279988 | A1 | | 12/2007 | Nguyen | |
| 2009/0257284 | A1 | * | 10/2009 | Roohparvar | 365/185.33 |
| 2010/0328983 | A1 | * | 12/2010 | Cheng | 365/51 |

FOREIGN PATENT DOCUMENTS

| | | |
|---|---|---|
| EP | 0 984 456 A1 | 3/2000 |
| GB | 2 263 378 A | 7/1993 |

OTHER PUBLICATIONS

International Search Report issued in international application No. PCT/US2011/039421 on Dec. 21, 2011 (4 pages).
Written Opinion issued in international application No. PCT/US2011/039421 on Dec. 21, 2011 (5 pages).

* cited by examiner

*Primary Examiner* — Douglas King
(74) *Attorney, Agent, or Firm* — Brinks Hofer Gilson & Lione (57) ABSTRACT

A method and apparatus for reducing power consumption during an operation in a non-volatile storage device is disclosed. A non-volatile storage device controller that is in communication with a non-volatile memory in the non-volatile storage device receives a characteristic corresponding to a time duration required for the non-volatile memory to complete an operation. The controller disables a circuit that indicates when an operation by the non-volatile memory is complete. The controller then initiates the operation in the non-volatile memory, and maintains the circuit in a disabled state for a first predetermined time that is a portion of the time duration. The controller enables the circuit upon expiration of the first predetermined time and prior to the completion of the operation. The controller receives an indication of the completion of the operation via the circuit.

18 Claims, 5 Drawing Sheets

FIG. 4

FRDY PULL-UP RESISTOR ACTIVATION

TECHNICAL FIELD

This application relates generally to the operation of non-volatile flash memory systems, and, more specifically, to a method and system for activating pull-up or pull-down resistors.

BACKGROUND

The ever-increasing capacity of small form factor memory cards allows for new possibilities in storing and distributing digital content. Content stored on commercially available cards such as MultiMedia cards (MMC) and Secure Digital (SD) cards may be accessed by a variety of host devices. The organizations that define standards for small form factor memory cards may set limits for the maximum instantaneous or average power that a memory card may consume. These limits are necessary so that manufacturers of host devices such as cellular telephones may budget the instantaneous or average power necessary for memory card access operations, and are necessary in order to maintain interoperability with future and legacy host devices.

As the storage capacity and complexity of small form factor memory cards increase, the instantaneous or average power potentially consumed by these devices also could increase, particularly during power-intensive operations such as reset, programming, writing, or erasing. For example, small form factor memory cards typically contain multiple NAND non-volatile memory dies. The flash memory ready/busy signal, FRDY, is a wired-OR combination of individual open drain outputs driven by non-volatile memory dies. The FRDY signal is driven to a logic low state by one or more dies to indicate that at least one non-volatile memory die is busy and not ready to process another command. A die that is not busy configures its FRDY output to a high-impedance state, thereby allowing other circuit elements to determine the FRDY wired-OR circuit output. When all of the NAND non-volatile memory dies are no longer busy, FRDY is pulled to a logic high state by a pull-up resistor to indicate that the dies are ready to process another command. Driving FRDY to a logic low state to indicate a busy status causes current to sink across the FRDY pull-up resistor. The amount of current sunk is dependent on the resistor value and the voltage drop across the resistor.

This current consumption across the pull-up resistor occurs at an inopportune time, because non-volatile memory dies may be performing a current-intensive operation such as a reset, erase, or programming at the same time that current is being sunk through the FRDY resistor in order to indicate that the dies are busy and not ready to process another command. The current sunk through the FRDY resistor may cause a memory card architecture to exceed an instantaneous or average current consumption established by a small form factor memory card standard. Existing non-volatile memory systems typically do not account for the additional current sunk through the FRDY pull-up resistor during NAND non-volatile memory die operation and have not addressed how to effectively reduce it without adversely impacting system operation.

One design approach to reduce the current consumption through a FRDY pull-up resistor is to increase its resistance. However, increasing the resistance of the pull-up resistor may slow the FRDY rising edge transition from a logic low state to a logic high state, which may adversely impact system operation and/or system performance. Incorporating a physically larger discrete resistor into the non-volatile storage device may increase the cost of the device. If the resistor is integrated into the non-volatile memory controller, increasing the resistance of the pull-up resistor may also increase the die area required for the controller.

Another design approach to reducing current consumption involves eliminating or disabling the inputs to the FRDY wired-OR circuit and polling the busy/ready status from each non-volatile memory die. However, polling each non-volatile memory die may increase the system power consumption. Moreover, disabling the open drain transistors in the FRDY wired-OR circuit may necessitate customized logic in the non-volatile memory die that is not available from every die manufacturer.

SUMMARY

Therefore, it would be advantageous to have a method or system that reduces the power consumption of wired-logic circuits when power-intensive operations are being performed in small form factor memory cards without adversely impacting system operation. Such a method or system may permit non-volatile storage devices such as small form factor memory cards to have increased storage capacity while still maintaining compliance with power consumption limits established by standards organizations.

In order to address these issues, a method and system is disclosed that disables a pull-up or pull-down resistor in a wired logic circuit that would otherwise sink current through the resistor when an operation in a non-volatile memory die is in progress. The wired logic circuit output signals whether the non-volatile memory dies executing an operation are ready to receive another command. When the wired logic circuit is disabled by disabling a current path through the resistor, its output may be ignored. The current path through the pull-up or pull-down resistor in the wired logic circuit is enabled shortly before the operation is expected to be completed, thus permitting the wired logic circuit to correctly indicate the completion of the operation. The power consumption of the circuit, and thus the small form factor memory card, is reduced during the operation by disabling the current path through the resistor in the wired-logic circuit. Reducing the power consumption of the memory card may permit the memory card to maintain compliance with power consumption limits established by standards organizations.

In one aspect, there is a method for performing an operation in a non-volatile storage device. A controller in a non-volatile storage device is in communication with a non-volatile memory in the non-volatile storage device. The controller receives a characteristic corresponding to a time duration required for the non-volatile memory to complete an operation. The controller disables a circuit that generates an indication of a completion of the operation by the non-volatile memory. Disabling the circuit reduces power consumed by the circuit. The controller then initiates the operation in the non-volatile memory. The controller maintains the circuit in a disabled state for a first predetermined time that is a portion of the time duration required to complete the operation. Upon expiration of the first predetermined time and prior to the completion of the operation by the non-volatile memory, the circuit is enabled. The controller then receives an indication of the completion of the operation via the circuit. If the indication of the completion of the operation is not received, the controller initiates a second operation a second predetermined time after enabling the circuit, where a sum of the first predetermined time and the second predetermined time is greater than or equal to the time duration required to complete the operation by the non-volatile memory.

In one aspect, maintaining the circuit in a disabled state includes setting a timer that can activate a processor in the controller and deactivating the processor after the timer is set. In another aspect, initiating a second operation a second predetermined time after enabling the circuit includes setting a timer that can activate a processor in the controller, deactivating the processor after the timer is set, and initiating the second operation after the timer activates the processor from the deactivated state.

In another aspect, there is non-volatile storage device including a non-volatile memory and a controller in communication with the non-volatile memory. The controller is operable to receive a characteristic corresponding to a time duration required for the non-volatile memory to complete an operation. The controller is also operable to disable a circuit that generates an indication of a completion of the operation by the non-volatile memory. Disabling the circuit reduces power consumed by the circuit. After disabling the circuit, the controller initiates the operation in the non-volatile memory and maintains the circuit in a disabled state for a first predetermined time that is a portion of the time duration. Upon expiration of the first predetermined time and prior to the completion of the operation by the non-volatile memory, the controller enables the circuit. The controller receives an indication of the completion of the operation via the circuit. If the indication of the completion of the operation is not received, the controller is operable to initiate a second operation a second predetermined time after enabling the circuit, where a sum of the first predetermined time and the second predetermined time is greater than or equal to the time duration required to complete the operation by the non-volatile memory.

In one aspect, the controller can maintain the circuit in a disabled state by setting a timer that can activate a processor in the controller and deactivating the processor after the timer is set. In another aspect, the controller can initiate a second operation a second predetermined time after enabling the circuit by setting a timer that can activate a processor in the controller, deactivating the processor after the timer is set, and initiating the second operation after the timer activates the processor from the deactivated state.

Other aspects and features and advantages thereof are possible and will be, or will become, apparent to one with skill in the art upon examination of the following detailed description and accompanying drawings. Hence, it is intended that the scope of the claimed invention as recited in the claims below will not be limited to the embodiments shown and described herein.

BRIEF DESCRIPTION OF THE DRAWINGS

The components in the figures are not necessarily to scale, emphasis instead being placed upon illustrating various aspects thereof. Moreover, in the figures, like referenced numerals designate corresponding parts throughout the different views.

DETAILED DESCRIPTION

A method and system for performing an operation such as read, write, program, or erase in order to comply with power consumption limitations is explained in further detail in the exemplary embodiments discussed in the foregoing figures and accompanying description.

A non-volatile storage device, such as a small form factor memory card, typically includes a number of non-volatile memories, such as NAND flash devices or dies. A controller in the non-volatile storage device may direct the non-volatile memory to complete an operation such as reading, writing/programming, erasing, or resetting the non-volatile memory. A ready/busy output of the non-volatile memory may indicate that an operation is in progress. A non-volatile storage device may include a large number of non-volatile memories. Individually connecting each non-volatile ready/busy output to the controller may require additional resources, such as a large number of controller inputs, or additional wiring/routing resources to connect each ready/busy signal to the controller.

Some architectures combine two or more non-volatile memory ready/busy outputs into a single ready/busy signal using wired logic, such as a wired-OR or wired-AND circuit. Such a wired logic signal may reduce the number of controller inputs required and may reduce the wiring/routing resources to provide the ready/busy indication from each non-volatile memory to the controller. The wired-logic signal may rely on a transistor or switch to drive the ready/busy signal to a logic low value (busy), and a pull-up resistor to pull the ready/busy signal to a logic high value (ready). When one or more memories coupled to the wired logic circuit indicate a busy condition by enabling a transistor or closing a switch, current is sunk through the pull-up resistor. This current consumption may occur throughout the time when a non-volatile memory operation is in progress, increasing the instantaneous current consumption of the non-volatile storage device and the average current consumption over a period of time. Some small form-factor memory card standards specify a maximum instantaneous or average current consumption limit. The current consumed by a wired logic circuit during the non-volatile memory operation may cause the non-volatile device to exceed a current specification. Alternatively, if the instantaneous or average current consumed by a wired logic circuit may be reduced, additional power-consuming operations may be simultaneously performed without exceeding a maximum instantaneous or average current limit.

A controller may advantageously reduce the current consumed by a wired logic circuit by selectively disabling the circuit for a portion of the time during which the non-volatile memory operation is pending or in progress. In an exemplary implementation, the FRDY ready/busy signal generation is optimized for power and performance by characterizing the time that a the non-volatile memory FRDY signal indicates a busy condition for a particular operation, and storing the characteristic in for use by the controller, then dynamically engaging and disengaging the FRDY pull-up resistor. In one embodiment, a wired logic circuit FRDY pull-up resistor may be enabled or disabled by executing a firmware command in the controller. Specifically, the FRDY pull-up resistor may be disabled prior to initiating a NAND operation that would cause a logic high-to-low transition on FRDY signal indicating that the non-volatile memory operation is in progress. The FRDY pull-up resistor may be engaged prior to the expected FRDY signal transition from logic low to logic high indicating the end completion of the non-volatile memory operation.

This FRDY generation method may eliminate the majority of the time that current sinks across the FRDY pull-up resistor by engaging or enabling the pull-up resistor only when the controller needs to check for FRDY status just prior to the expected time when FRDY level changes from logic low to logic high. Such a method and system can lower the average system current consumption by 1 mA to 3 mA in an exemplary implementation.

For example, if a block erase operation typically takes no less than 2.5 ms for a non-volatile memory to complete, the controller may disable the wired logic circuit that generates the FRDY busy/ready signal for a predetermined time, such as 2.2 ms, and ignore the output of the ready/busy wired logic circuit during this interval. In one implementation, disabling the wired logic circuit includes disabling the current path through the pull-up resistor. The controller may determine the predetermined time interval using characteristic information about the non-volatile memory and the requested operation. The operation is close to completion once this predetermined time interval transpires, so the controller may enable the wired logic circuit and monitor the ready/busy output to receive an indication that the block erase operation is complete, such as a transition of the signal from a logic low value (busy) to a logic high value (ready). By disabling the wired logic circuit for 2.2 ms, the instantaneous power and average power consumed by the wired logic circuit is reduced.

Figure 1:
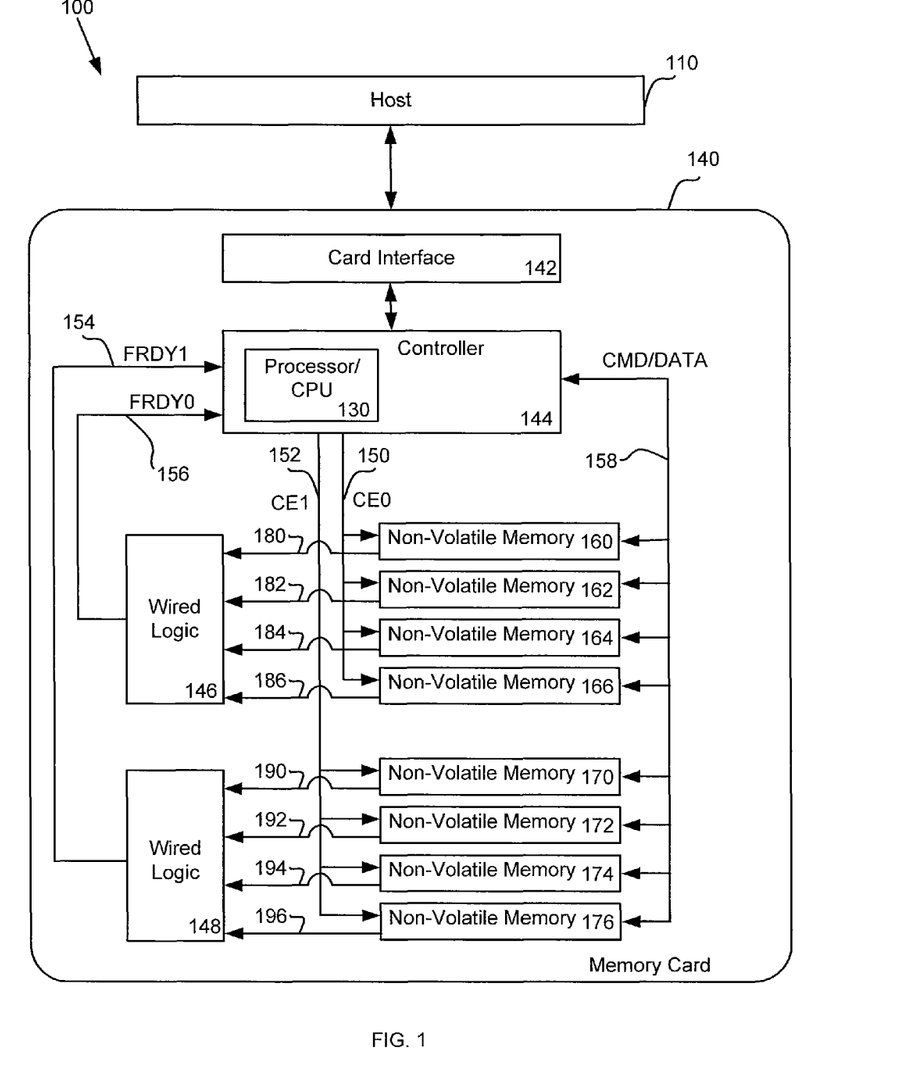
FIG. 1 is a diagram illustrating an exemplary system for performing an operation in a non-volatile storage device.

FIG. 1 is a diagram illustrating an exemplary system for performing an operation in a non-volatile storage device. The exemplary system 100 includes a host 110 in communication with a non-volatile storage device 140. Examples of a host 110 include personal computers, notebook computers, personal digital assistants, digital cameras, cellular telephones, portable audio players, automobile sound systems, and similar types of equipment. The non-volatile storage device 140 may be a removable small form factor memory card, such as a Secure Digital (SD) or MultiMedia Card (MMC). While the system 100 shows a removable non-volatile storage device 140, other embodiments may include a non-volatile storage device 140 permanently installed within or affixed to the host 110.

The non-volatile storage device 140 includes a card interface 142, a controller 144, and a number of non-volatile memories 160, 162, 164, 166, 170, 172, 174, and 176. The card interface 142 receives commands from the host 110, and exchanges data and results with the host 110. For example, the card interface 142 may receive commands from the host to read data stored in the non-volatile storage device 140, store data in the non-volatile storage device 140, or perform other operations such as erasing or formatting the card. The commands and data exchanged between the host 110 and the non-volatile storage device 140 may be in accordance with a small form factor memory card interface standard. The card interface 142 exchanges commands and data with the controller 144, which in turn, exchanges commands and data with the non-volatile memories 160-176 in order to complete the request by the host 110.

The card interface 142 and the controller 144 may be implemented in hardware, firmware, software, or any combination thereof, arranged to implement the functionality of the card interface 142 and the controller 144, respectively, such as the functionality described in the embodiments of FIGS. 1-4 and the accompanying text. In one embodiment shown in FIG. 1, the controller 144 includes a processor 130, and at least some functionality of the controller 144 is implemented utilizing a processor 130 configured with processor executable instructions, where the controller 144 may also comprise other peripheral logic or circuitry to complement the processor 130. The processor executable instructions may be stored in random access memory (RAM) within the non-volatile storage device 140, or non-volatile memory, such as a read-only memory (ROM), EEPROM (Electrically Erasable and Programmable Read Only Memory), or E-flash (embedded flash) within the non-volatile storage device 140. The processor 130 may be any type of proprietary or commercially available microcontroller, processor, or processor logic core.

The non-volatile memories 160-176 may be any type of available non-volatile memory device. One example of such a device is Toshiba SLC NAND flash part number TC58NVG2S3ETA00. Similar non-volatile memory devices are available from other manufacturers. The controller 144 may initiate other operations without direction from the host 110, such as operations to initialize or maintain data and the non-volatile memories 160-176.

The non-volatile memories 160-176 may be divided into groups or sets, were each group or set shares a chip enable (CE) signal 150, 152. Referring to FIG. 1, chip enable zero (CE0) is shared by non-volatile memories 160, 162, 164, and 166. The controller 144 may simultaneously send a command to all of the non-volatile memories 160, 162, 164, and 166 by asserting the chip enable zero (CE0) signal 150 and transmitting a command on the command/data bus 158. For example, for the Toshiba SLC NAND flash part number TC58NVG2S3ETA00 non-volatile memory, the command 0xFF (reset) is transmitted to the non-volatile memory on the command/data bus 158 while asserting the chip enable signal communicatively coupled to the non-volatile memory die. In this example, all of the non-volatile memories 160, 162, 164, and 166 sharing a single chip enable signal 150 will be reset when the reset command is transmitted on the command/data bus 158 in the chip enable signal is asserted. Other commands, such as 0x30 (read), 0x10 (auto page program), or 0x11 (multi page program), may access one or more non-volatile memories 160, 162, 164, and 166 sharing the chip enable.

Each non-volatile memory 160, 162, 164, and 166 indicates whether an operation is in progress by generating its respective FRDY signal 180, 182, 184, and 186. The signals are combined in a wired logic block 146 to produce a single FRDY ready/busy indication signal 156 that is an input to the controller 144. For example, FRDY may have a logic high state when all of the non-volatile memories 160, 162, 164, and 166 are ready to accept another command, and a logic low state when one or more non-volatile memories 160, 162, 164, and 166 are busy processing an operation previously requested by the controller 144.

Similarly, a second wired logic block 148 combines the FRDY signals 190, 192, 194, and 196 from the non-volatile memories 170, 172, 174, and 176 associated with chip enable 1 (CE1) 152, generating a second FRDY ready/busy indication signal 154 that is an input to the controller 144. While the non-volatile storage device 140 shows two wired logic circuits 146, 148 generating two FRDY ready/busy signals 154, 156 corresponding to each chip enable 150, 152 other combinations are possible. For example, FRDY signals 180, 182, 184, 186, 190, 192, 194, and 196 may be combined into a single FRDY signal that is an input to the controller 144, using a single wired logic circuit.

Figure 2A:
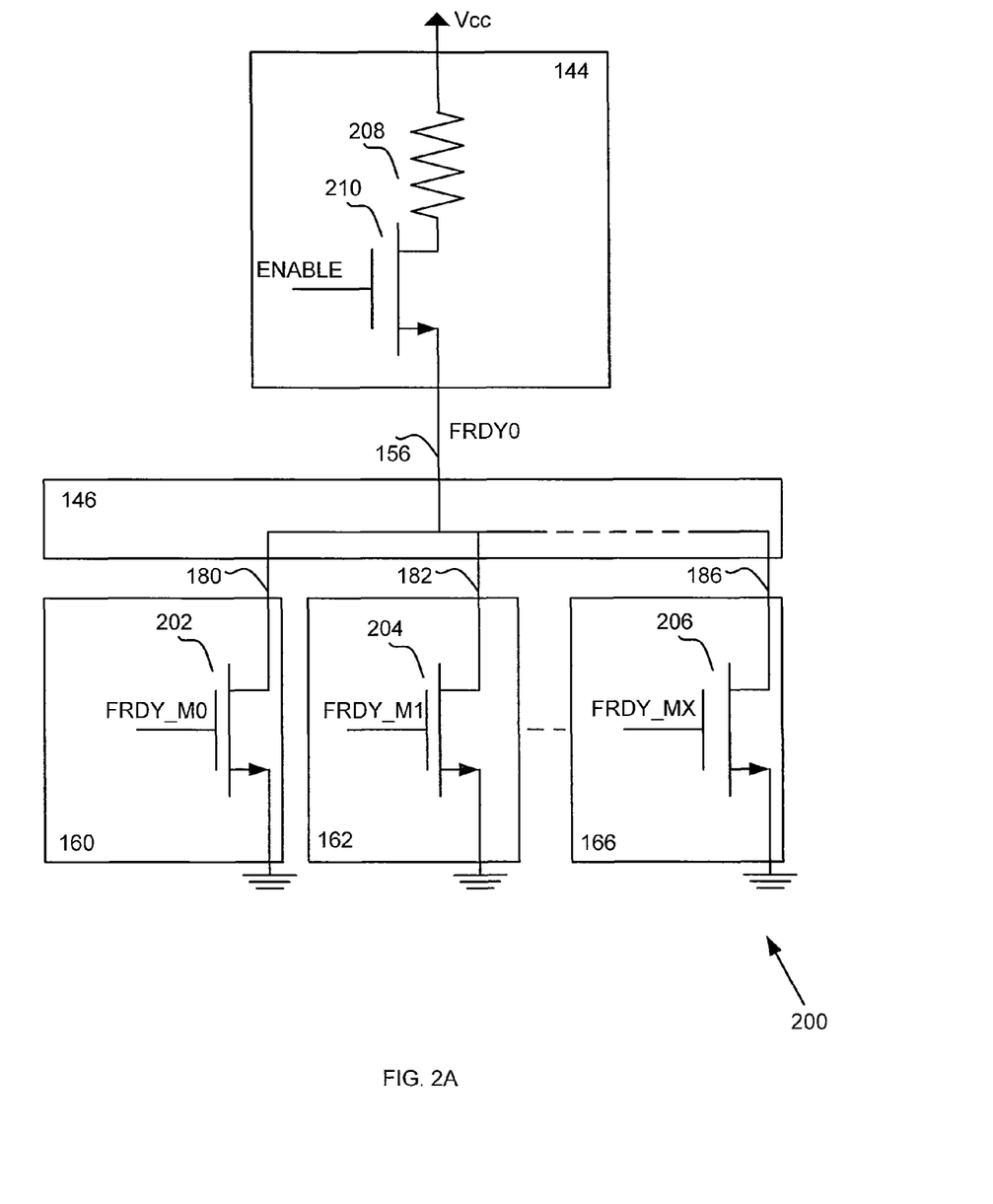
FIG. 2A is a diagram illustrating an exemplary circuit operative to indicate the completion of an operation in a non-volatile storage device.

FIG. 2A is a diagram illustrating an exemplary circuit 200 operative to indicate the completion of an operation in a non-volatile storage device 140. The exemplary circuit 200 includes a pull-up resistor 208 and N-channel MOSFET transistors 202, 204, 206 and 210. While all of the transistors are not shown in FIG. 2A, the circuit 200 includes one transistor for each non-volatile memory 160, 162, 164, 166. The source terminal of each transistor 202, 204, and 206 is grounded, and the drain terminals are coupled together and connected to a voltage supply (Vcc) through an enable transistor 210 in series with a pull-up resistor 208. The FRDY0 ready/busy output 156 of the circuit 156 is coupled to the source terminals of the transistors 202, 204, and 206. The gate of each transistor 202, 204, and 206 is coupled to ready/busy signals FRDY_M0 180, FRDY_M1 182, and FRDY_MX 186 generated by each non-volatile memory 160, 162, and 166.

Other wired logic circuits are possible to implement the functionality of the circuit as described below. For example, BJT or other types of transistors, or other switching logic may be used instead of the MOSFET transistors 202, 204, 206, and 210 shown. Further, while a pull-up resistor 208 is shown, other wired logic circuit configurations using pull-up or pull-down resistors are possible to create equivalent circuits that accept active low or active high inputs and generate active low or active high outputs, where switching logic is used to generate one logic state at the circuit output, and a pull-up or pull down resistor or resistors are used to generate the other logic state at the circuit output.

In the exemplary circuit 200, when all of the non-volatile memories are ready to begin another operation, the non-volatile memories 160, 162, and 166 drive the ready/busy signals FRDY_M0 180, FRDY_M1 182, and FRDY_MX 186 to a logic low state. As a result, there is no current path through the transistors 202, 204, and 206 between the FRDY0 ready/busy output 156 and the circuit 200 ground. If the ENABLE input of the transistor 210 is biased to allow current to pass between the transistor 210 source and drain terminals, the pull-up resistor 208 may pull the FRDY0 ready/busy output 156 to a logic high state, thus indicating that all of the non-volatile memories are ready to begin another operation.

If any of the non-volatile memories 160, 162, and 166 are busy performing an operation, the busy non-volatile memory drives its ready/busy signal FRDY_M0 180, FRDY_M1 182, or FRDY_MX 186 to a logic high state. This creates one or more current paths between the through the transistors 202, 204, and 206 between the FRDY0 ready/busy output 156 and the circuit 200 ground. Thus, the FRDY0 ready/busy output 156 is driven to a logic low state, thus indicating that at least one of the non-volatile memories is busy with a currently requested operation. When the FRDY 0 ready/busy output 156 is driven to a logic low state, current is sunk through the pull-up resistor 208 only if the ENABLE input of the transistor 210 is biased to allow current to pass between the transistor 210 source and drain terminals.

Thus, the enable transistor 210 may selectively enable or disable the wired logic circuit 200 by enabling or disabling the current path through the pull-up transistor. The power consumed by the wired logic circuit 200 may be reduced when the current path through the pull-up resistor 208 is disabled. The ENABLE input of the transistor 210 may be controlled by other logic in the non-volatile storage device 140, such as the processor 130 or logic in the controller 144.

Figure 2B:
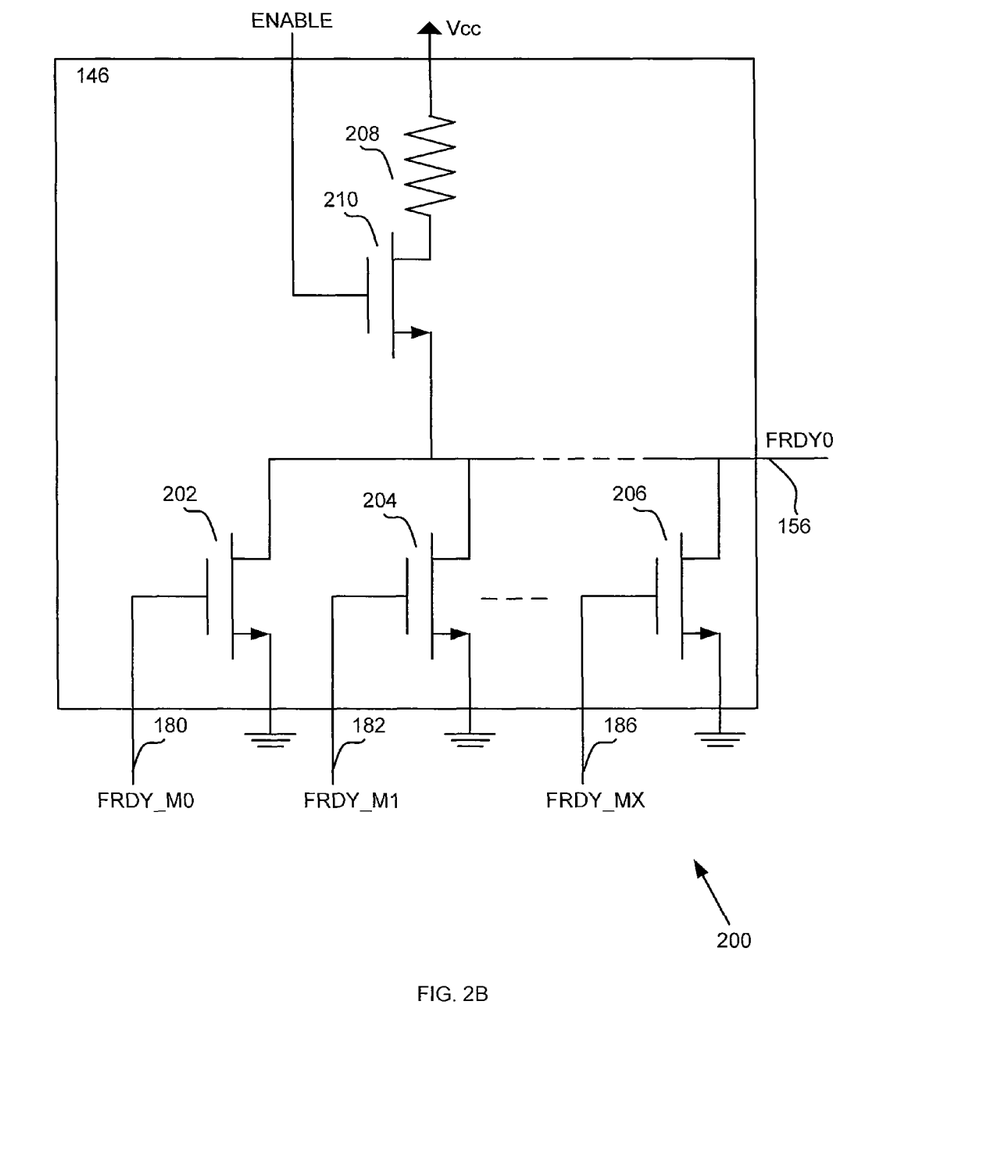
FIG. 2B is a diagram illustrating an exemplary circuit operative to indicate the completion of an operation in a non-volatile storage device.

As shown in FIG. 2B, the exemplary circuit 200 in FIG. 2B may be partitioned among the wired logic block 146, controller 144, or non-volatile memories 160-166. Other partitioning of the circuit 200 is also possible. Referring briefly back to FIG. 1, the arrangement of circuit elements shown in the wired logic circuit 200 of FIG. 2A may be partitioned in different elements or functional blocks of the non-volatile storage device 140. For example, FIG. 2B is a diagram illustrating an exemplary circuit operative to indicate the completion of an operation in a non-volatile storage device. The wired logic circuits in FIGS. 2A and 2B are functionally equivalent. In FIG. 2B, a wired logic circuit 200 is contained in the wired logic blocks 146 and 148 shown in FIG. 1. However, in FIG. 2A, the wired logic circuit 200 is divided among several elements of the non-volatile storage device 140 shown in FIG. 1. For example, each transistor 202, 204, 206 is contained within its respective non-volatile memory 160, 162, and 166. Further, the pull-up resistor 208 is contained in the memory controller 144. Other arrangements or partitioning of the elements of the wired logic circuit 200 are also possible.

Figure 3:
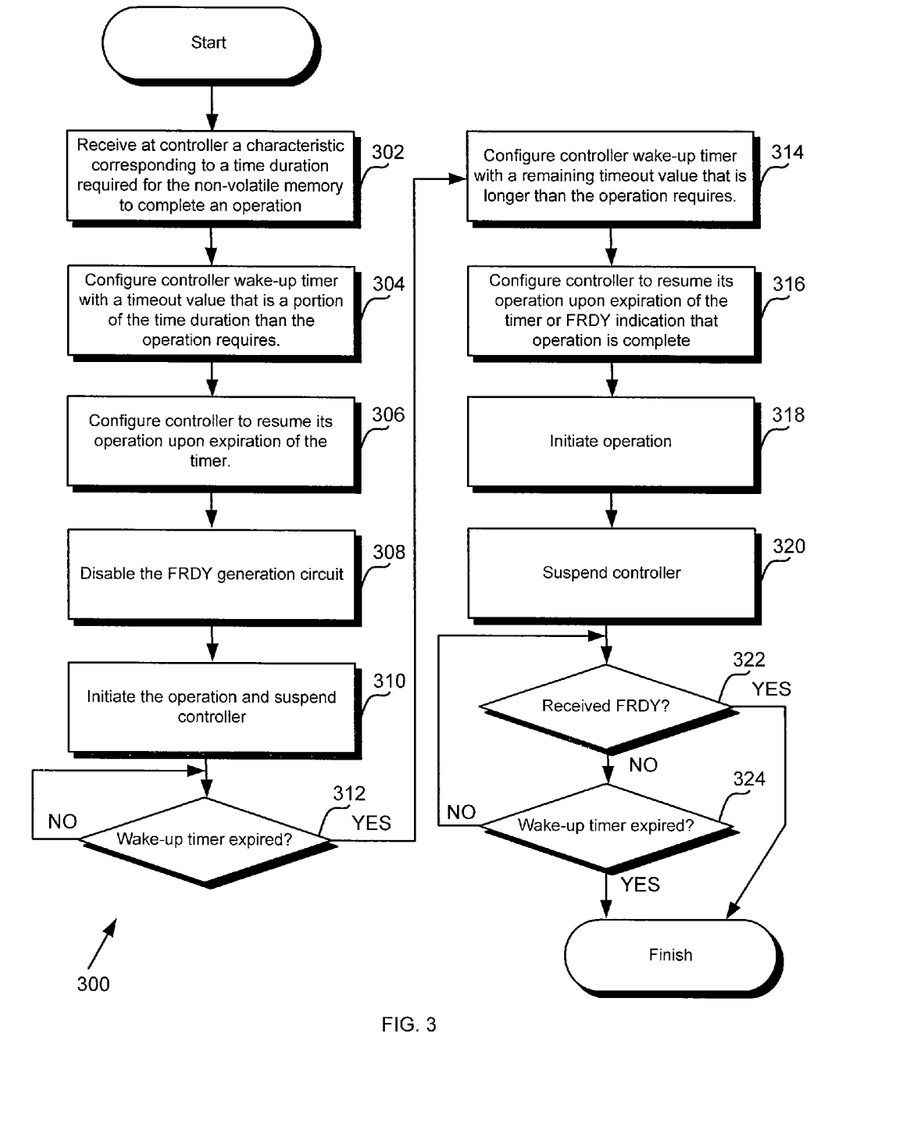
FIG. 3 shows exemplary steps for performing an operation in the non-volatile storage device of FIG. 1 containing a circuit such as the exemplary circuit shown in FIG. 2A or FIG. 2B.

The circuit 200 shown in FIG. 2A or FIG. 2B may be advantageously utilized in the non-volatile storage device shown in FIG. 1 in order to reduce the power consumption of the device. FIG. 3 shows exemplary steps for performing an operation in the non-volatile storage device of FIG. 1 containing the circuit shown in FIG. 2A or FIG. 2B. The steps 300 disable the current path through the pull-up resistor 208 for a portion of time while the requested operation is in progress, then enable the pull-up resistor before the operation is complete in order to detect the logic low to logic high state transition of FRDY indicative of the completion of the operation.

Control begins at step 302, where the controller receives a characteristic corresponding to a time duration required for the non-volatile memory 160-176 to complete an operation. The characteristic may be stored in the non-volatile memory 160-176, or in another volatile or non-volatile storage in the controller 144 or elsewhere in the non-volatile storage device 140. The controller may receive the characteristic in response to a read command issued by the controller or the processor 130 contained in the controller 144. Using the characteristic, the controller 144 may determine a portion of the time duration that the wired logic circuit 200 may be disabled in order to reduce power consumption.

Control passes to step 304, where a timer in the controller 144 is configured with a first predetermined time (timeout value) corresponding to a portion of the duration of time that the non-volatile memory operation is expected to take to complete. In one embodiment, the timer may be implemented as a counter, where the timer may count from the timeout value to zero or another value. The time it takes for the timer to count to zero or another value corresponds to the desired duration of time. When the timer reaches this value (expires), the timer may send an indication or trigger to the controller 144 to activate, resume operation, or wake up from a suspended state. Configuring the timer in step 304 allows the controller to be suspended for a portion of time required to complete the operation and then activated in order to enable the wired logic circuit 200 that generates the FRDY indication when the operation is complete. At step 306, the controller is configured to activate or resume its operation when the timer expires.

In step 308, the FRDY generation circuit 200 is disabled. As explained above, disabling the circuit 200 may comprise configuring the transistor 210 in series with the pull-up resistor 208 to prevent current flow through the resistor 208. Such a configuration may be completed by a register write, or configuring other logic that can bias the transistor 210 to a saturation or active mode that permits current flow between the source and drain of the transistor, and that also can bias the transistor 210 to an inactive mode that prevents current flow between the source and drain of the transistor. In step 310, the requested operation is initiated and the controller 144 is suspended. Operations may include read, write, erase, program, overwrite, or any other operation that can be performed in a non-volatile memory. Suspending or deactivating the controller 144 may include deactivating or halting program execution of the processor 130, disabling a clock or clock tree in the logic in the controller 144 or processor 130, or any other actions that may slow, partially disable, or completely disable operation of the logic or circuitry in the controller 144.

Once the controller 144 is suspended or deactivated, control passes to step 312 and remains at step 312 until the timer has expired, indicating the passage of a portion of the time required to complete the operation. The timer expiration triggers the activation of the controller from the deactivated or suspended state from step 310. Activating the controller 144 may include activating the processor 130, enabling a clock or clock tree in the controller 144, or generally reversing the effect of any operation performed in step 310.

Control passes from step 312 to step 314, where the timer in the controller 144 is configured with a second predetermined time (timeout value) corresponding to a remaining duration of time that is greater than or equal to the duration of time that the non-volatile memory operation is expected to take to complete. Thus, the sum of timeout values configured in steps 304 and 314 correspond to a duration of time greater than or equal to the expected time required to complete the operation. Using the timer for this purpose avoids the situation where the system may hang if the FRDY indication to resume system operation does not occur.

Control passes to step 316, where the controller 144 is configured to activate, resume operation, or wake up from a suspended state upon expiration of the timer or when it receives an indication via the circuit FRDY output signals 154, 156 that an operation is complete. An indication may include a transition of one of the FRDY output signals 154, 156, such as a transition from a logic low state (busy) to a logic high state (ready), or detecting a logic state of one or more of the FRDY output signals 154, 156, such as detecting that both signals are in a logic high state (ready). Control then passes to step 318, where the controller 144 initiates the desired operation, such as by transmitting a command to one or more non-volatile memories 160-176. In step 320, the controller suspends its operation pending completion of the command. As previously explained, suspending or deactivating the controller 144 may include deactivating or halting program execution of the processor 130, disabling a clock or clock tree in the logic in the controller 144 or processor 130, or any other actions that may slow, partially disable, or completely disable operation of the logic or circuitry in the controller 144.

Once the controller 144 is suspended, control passes to step 322, and cycles between steps 322 and 324 to wait for a condition to activate or resume operation. Step 322 determines whether the FRDY indication has been received, such as a transition from a logic low state (busy) to a logic high state (ready) indicating that the non-volatile memory 160-176 has completed the requested operation. If the FRDY indication has been received via the wired logic circuit, then the controller operation is resumed, such as by activating the processor 130, enabling a clock or clock tree in the controller 144, or generally reversing the effect of any operation performed in step 320. The steps 300 are then finished, and the controller may repeat the steps 300 perform another operation.

If the FRDY indication has not been received, then control passes to step 324 to determine whether the timer has expired. As explained above, the timer expires when a total elapsed time greater than the expected duration of time to complete the operation has elapsed. If the timer has not expired, control passes back to step 322 to check again for the FRDY indication. If the timer has expired, then the controller operation is resumed, such as by activating the processor 130, enabling a clock or clock tree in the controller 144, or generally reversing any operation performed in step 320, thus permitting the controller to perform additional operations. The steps 300 are then finished, and may be repeated to perform another operation.

While the exemplary steps 300 describe disabling or suspending the controller 144 and re-enabling the controller upon expiration of the timer or transition of the FRDY signal, other implementations are possible. For example, the controller 144 may not be suspended or disabled in step 310 and 320, and the expiration of the timer in step 312 or step 324, or transition of the FRDY signal in step 322, may trigger a processor 130 interrupt within the controller 144. The controller may utilize an interrupt to detect the occurrence of the events shown in steps 312, 322, or 324. The interrupt may be triggered by the timer expiration or the FRDY transition. In this implementation, the controller 144 continues to perform other functions and interrupts received at the processor 130 indicate when the circuit 200 should be enabled, or when the non-volatile memories are ready to perform the next operation.

Figure 4:
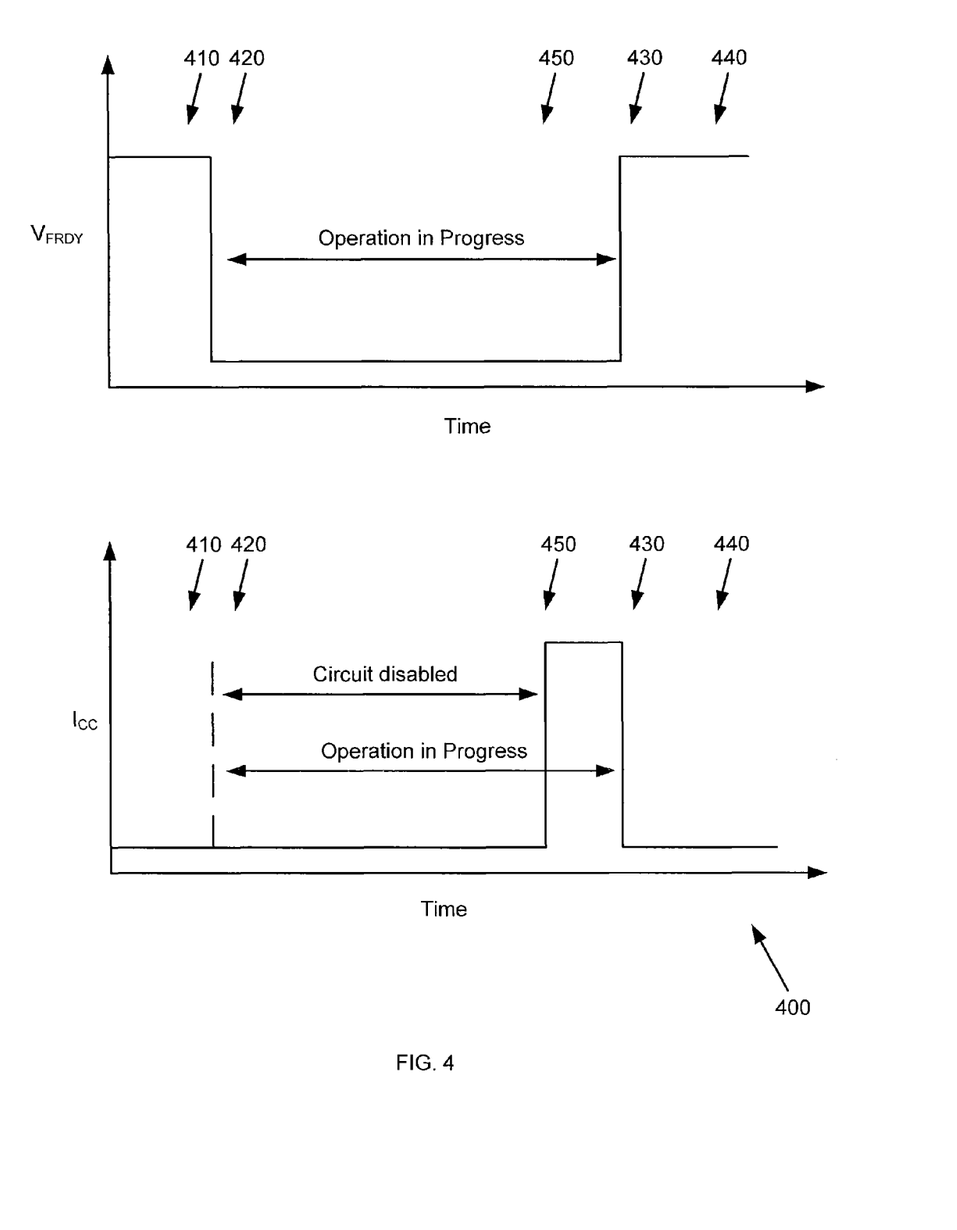
FIG. 4 is a diagram illustrating exemplary current consumption when performing an operation in the non-volatile storage device architecture of FIG. 1 containing a circuit such as the exemplary circuit shown in FIG. 2A or FIG. 2B.

FIG. 4 is a diagram illustrating exemplary current consumption when performing an operation in the non-volatile storage device architecture of FIG. 1 containing the circuit shown in FIG. 2A or FIG. 2B. One graph in FIG. 4 shows the voltage value of one of the FRDY signals 154, 156. The second graph in FIG. 4, using the same x-axis time reference, shows the current consumption of the non-volatile storage device 140. The current consumption of the non-volatile storage device 140 may be externally measured by probing the power supply to the device. Commands may be sent to the device 140 by the host 110. The controller 144 may respond to the command by performing operations within the device 140, and changes to the current consumption in response to performed operations may be monitored. At the time indicated by reference 410, the non-volatile memories are ready to perform new operations, as indicated by logic high state of the FRDY signal. At the time indicated by reference 420, the controller 144 has disabled the wired logic FRDY circuit 200 and issued a command. Referring briefly back to FIG. 2A, the commanded non-volatile memory responds by activating a transistor 202-206 to indicate a busy status, pulling the FRDY signal to a logic low state. However, in contrast to a wired-OR circuit that does not contain an enable transistor 210, the current path between $V_{CC}$ and ground through the resistor 208 is not activated because the enable transistor 210 in series with the resistor 208 is disabled. Thus, there is no substantial increase in current consumption at the time indicated by reference 420. The controller may maintain the circuit 200 in this state between the time indicated by reference 420 and the time indicated by reference 450. This time duration may be a portion of the total time duration required to complete the memory operation.

At the time indicated by reference 450, the controller 144 enables the current path through the pull-up resistor 208 so that the pull-up resistor 208 may pull the FRDY output to a logic high state when the operation completed. The current path is enabled by enabling the transistor 210. Current sunk through the resistor 208 during the remainder of the operation between the time indicated by reference 450 and the time indicated by reference 430 is apparent by the increase in current consumption shown in the second graph of FIG. 4. The change in current consumption may correspond to the resistance value of the resistor 208 and the voltage drop across the resistor 208. The increased current consumption continues for the remaining time that the operation is in progress. When the operation completes, the activated transistor or transistors 202-206 in the wired-logic circuit 200 are disabled, permitting the pull-up resistor 208 to pull the FRDY signal to a logic high state, and interrupting the current path through the pull-up resistor 208. The current consumption decreases by an amount corresponding to the current sunk through the pull-up resistor 208 while the operation was in progress. At the time indicated by reference 440, the non-volatile memories 160-172 are ready to perform new operations. The instantaneous current consumption and average current consumption during the operation may be reduced by selectively disabling the current path through the pull-up resistor 208 in the circuit 200 during a portion of the operation, which reduces the current consumption as shown in FIG. 4 between time indicated by reference 420 and time indicated by reference 450.

The exemplary methods and systems disclosed reduce system current consumption by disabling the wired logic circuit used to generate the non-volatile memory FRDY ready/busy signal when the signal is not needed. Specifically, the power usage resulting from current passing through the FRDY pull-up resistor is reduced by disabling the current path through the resistor 208. The circuit is selectively enabled at around when the completion of the operation is expected (as predicted using characteristic information), so that the transition of the FRDY signal from the logic low state (busy) to logic high state (ready) may be detected by the non-volatile memory controller.

The accuracy of the resistance value of the pull-up resistor and its change in resistance as a function of operating temperature will be less critical because current will be sunk through the resistor for generally a shorter duration of time. Stated another way, the inaccuracy of the FRDY pull-up resistor value may be less significant and may have a reduced impact on the overall power consumption because current flows through the resistor for a reduced amount of time. Moreover, the exemplary systems and methods disclosed herein may make it feasible to utilize a stronger pull-up resistor in order to improve the FRDY signal logic-low to logic-high transition. A pull-up resistor with a reduced resistance value may typically increase power consumption. However, this increase in power consumption may be partially or completely offset by reducing the amount of time that current flows through the resistor utilizing the methods and systems disclosed herein.

While many of the foregoing examples and embodiments apply to small form factor memory cards, operations, and wired logic used therein, the methods and systems disclosed herein are applicable to any circuit or system where wired logic is utilized or where a pull-up or pull-down resistor sinks current while an operation is in progress. In these applications, if the duration of the operation can be characterized, power may be conserved by disabling a current path through a pull-up or pull-down resistor until shortly before the expected completion of the operation. Re-enabling the power-consuming circuit by enabling the current path through the resistor may then allow the circuit output generate the signal indicative of the completion of the operation.

Although the invention has been described with respect to various system and method embodiments, it will be understood that the invention is entitled to protection within the full scope of the appended claims.

The invention claimed is:

1. A method for performing an operation in a non-volatile storage device, the method comprising:
 performing, by a controller in a non-volatile storage device, the controller in communication with a non-volatile memory in the non-volatile storage device:
  receiving at the controller a characteristic corresponding to a time duration required for the non-volatile memory to complete an operation;
  disabling a circuit operative to generate an indication of a completion of the operation by the non-volatile memory, wherein disabling the circuit reduces power consumed by the circuit;
  initiating the operation in the non-volatile memory;
  maintaining the circuit in a disabled state for a first predetermined time, wherein the first predetermined time comprises a portion of the time duration;
  enabling the circuit upon expiration of the first predetermined time and prior to the completion of the operation by the non-volatile memory; and
  upon completion of the operation by the non-volatile memory, receiving at the controller an indication of the completion of the operation via the circuit.

2. The method of claim 1, the method further comprising:
 if the indication of the completion of the operation is not received, initiating a second operation a second predetermined time after enabling the circuit, wherein a sum of the first predetermined time and the second predetermined time is greater than or equal to the time duration required to complete the operation by the non-volatile memory.

3. The method of claim 2, wherein initiating a second operation a second predetermined time after enabling the circuit comprises:
 setting a timer operative to activate a processor in the controller;
 deactivating the processor after the timer is set; and
 after the timer activates the processor from the deactivated state, initiating the second operation.

4. The method of claim 1, wherein maintaining the circuit in a disabled state comprises:
 setting a timer operative to activate a processor in the controller; and
 deactivating the processor after the timer is set.

5. The method of claim 1, wherein the operation comprises erasing at least a portion of the non-volatile memory.

6. The method of claim 1, wherein the operation comprises programming at least a portion of the non-volatile memory.

7. The method of claim 1, wherein the circuit comprises a pull-up or pull-down resistor and a transistor configured to selectively permit current through the resistor, wherein disabling the circuit comprises disabling the transistor.

8. The method of claim 1, wherein the circuit comprises a pull-up or pull-down resistor and a transistor configured to selectively permit current through the resistor, wherein enabling the circuit comprises enabling the transistor.

9. The method of claim 1, wherein the characteristic is received from the non-volatile memory.

10. A non-volatile storage device, comprising:
 a non-volatile memory; and
 a controller in communication with the non-volatile memory, the controller operable to:
  receive at the controller a characteristic corresponding to a time duration required for the non-volatile memory to complete an operation;

disable a circuit operative to generate an indication of a completion of the operation by the non-volatile memory, wherein disabling the circuit reduces power consumed by the circuit;

initiate the operation in the non-volatile memory;

maintain the circuit in a disabled state for a first predetermined time, wherein the first predetermined time comprises a portion of the time duration;

enable the circuit upon expiration of the first predetermined time and prior to the completion of the operation by the non-volatile memory; and upon completion of the operation by the non-volatile memory, receive at the controller an indication of the completion of the operation via the circuit.

11. The non-volatile storage device of claim 10, wherein the controller is further operable to:

if the indication of the completion of the operation is not received, initiating a second operation a second predetermined time after enabling the circuit, wherein a sum of the first predetermined time and the second predetermined time is greater than or equal to the time duration required to complete the operation by the non-volatile memory.

12. The non-volatile storage device of claim 11, wherein initiating a second operation a second predetermined time after enabling the circuit comprises:

setting a timer operative to enable a processor in the controller;

deactivating the processor after the timer is set; and after the timer activates the processor from the deactivated state, initiating the second operation.

13. The non-volatile storage device of claim 10, wherein maintaining the circuit in a disabled state comprises:

setting a timer operative to activate a processor in the controller; and deactivating the processor after the timer is set.

14. The non-volatile storage device of claim 10, wherein the operation comprises erasing at least a portion of the non-volatile memory.

15. The non-volatile storage device of claim 10, wherein the operation comprises programming at least a portion of the non-volatile memory.

16. The non-volatile storage device of claim 10, wherein the circuit comprises a pull-up or pull-down resistor and a transistor configured to selectively permit current through the resistor, wherein disabling the circuit comprises disabling the transistor.

17. The non-volatile storage device of claim 10, wherein the circuit comprises a pull-up or pull-down resistor and a transistor configured to selectively permit current through the resistor, wherein enabling the circuit comprises enabling the transistor.

18. The non-volatile storage device of claim 10, wherein the characteristic is received from the non-volatile memory.

* * * * *